United States Patent [19]
Giulie et al.

[11] 4,353,776
[45] Oct. 12, 1982

[54] LAMINATING MACHINE WITH WRINKLE PREVENTION SYSTEM

[75] Inventors: Joseph D. Giulie, Palo Alto, Calif.; Michael K. Sabo, Glenview, Ill.

[73] Assignee: General Binding Corporation, Northbrook, Ill.

[21] Appl. No.: 217,655

[22] Filed: Dec. 18, 1980

[51] Int. Cl.³ ............................................. B30B 15/34
[52] U.S. Cl. .................................. 156/555; 100/93 P; 100/93 RP; 156/581; 156/583.1; 156/583.3; 156/583.91
[58] Field of Search .................. 156/555, 583.1, 583.3, 156/583.91; 100/93 P, 93 RP

[56] References Cited

U.S. PATENT DOCUMENTS 3,770,550 11/1973 Levitan ................................ 156/555
3,870,582 3/1975 Brackett et al. ................. 156/583.3
4,097,326 6/1978 Giulie et al. .
4,249,977 2/1981 Bartholomew ..................... 156/581

FOREIGN PATENT DOCUMENTS 17549 of 1912 United Kingdom ............. 156/583.3

Primary Examiner—Caleb Weston
Attorney, Agent, or Firm—Hill, Van Santen, Steadman, Chiara & Simpson

[57] ABSTRACT

A laminating machine is disclosed for use in laminating upper and lower heat activatible films on an object. Preferably a packet is employed having upper and lower film leaves within which the object is placed. The packet is received in the laminating machine which has a heating and compression zone formed of upper and lower heater assemblies followed by drive rollers. The heater assemblies are movable towards one another and both heat and compress the film packet as it moves through the machine drawn by the drive rollers. At least one of the heater assemblies has a tapering member which causes increased pressure along central portions of the packet relative to edge portions so as to create a wave in front of the heating and compression zone which spreads the material out evenly and prevents wrinkling or creasing during laminating.

20 Claims, 12 Drawing Figures

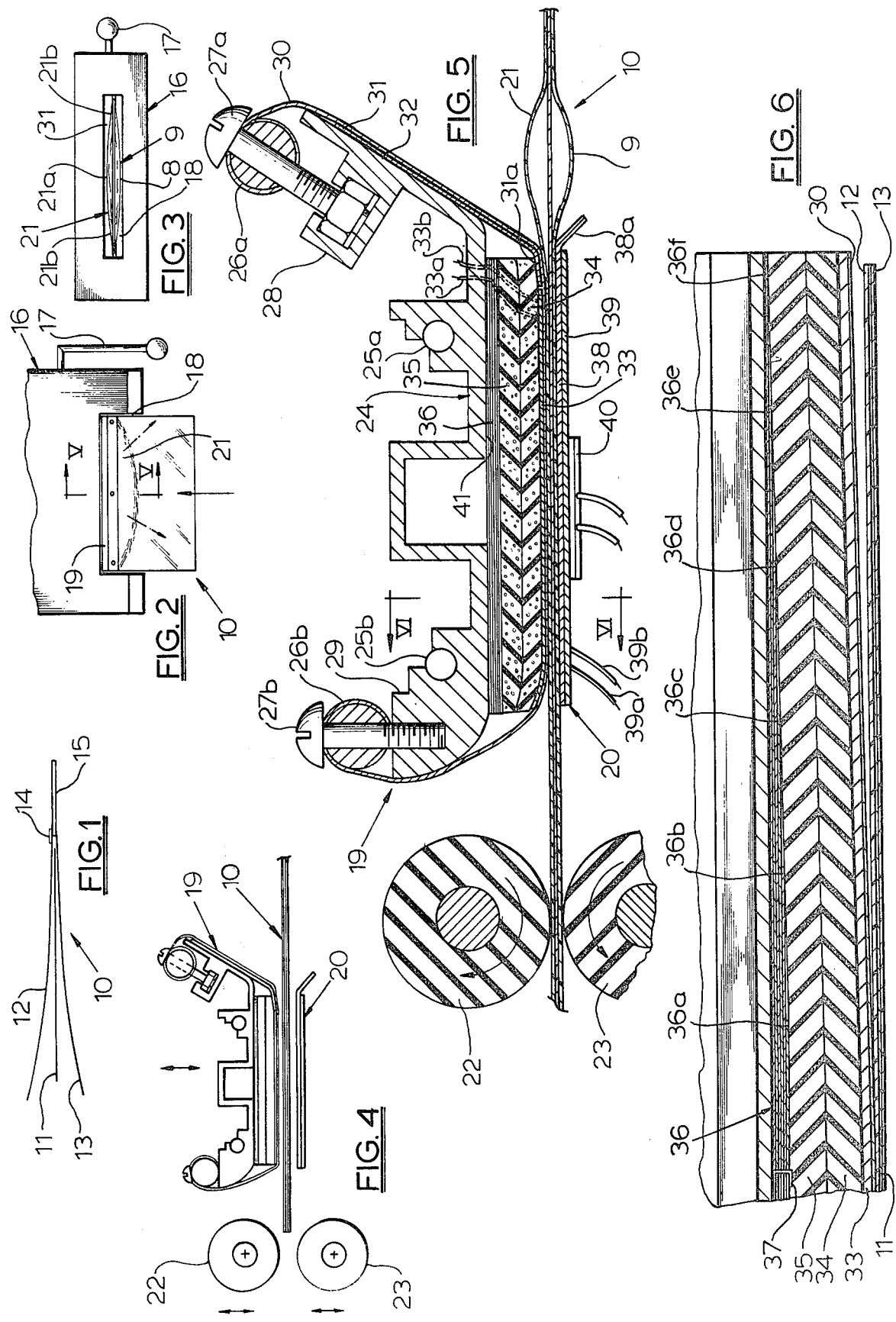

FIG. 7
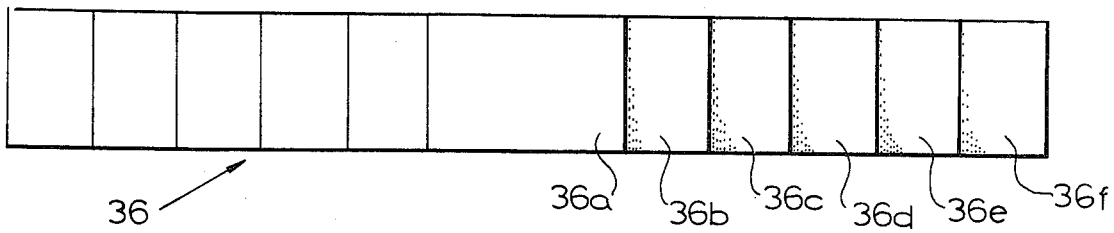
FIG. 8
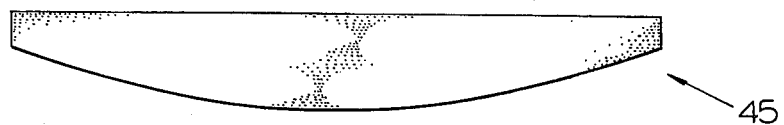
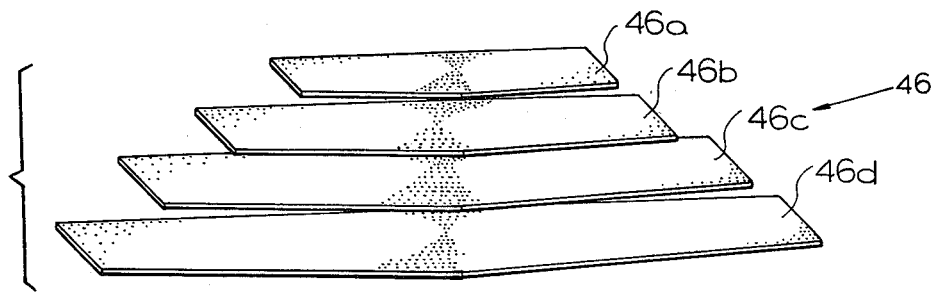
FIG. 9A
FIG. 9B
FIG. 10A
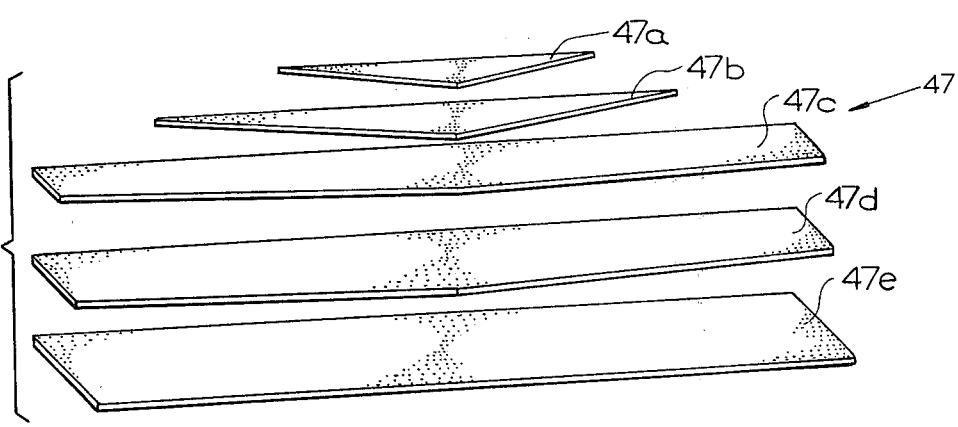
FIG. 10B
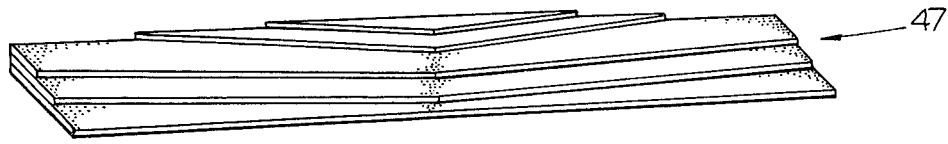

4,353,776

LAMINATING MACHINE WITH WRINKLE PREVENTION SYSTEM

BACKGROUND OF THE INVENTION

In earlier U.S. Pat. No. 4,097,326, incorporated herein by reference, a laminating machine is described which receives laminating packets containing an object to be laminated. An example of such a laminating packet is shown in FIG. 1 of the instant application and has upper and lower leaves joined at one edge and attached by tape to a cardboard leader member. The laminating machine has upper and lower heating plates which are movable towards one another and form a heating and compression zone. The packet is drawn through the heating and compession zone by rearwardly arranged upper and lower drive rollers which form a nip for first engaging the cardboard tab and then initiating movement of the packet through the heating and compression zone.

With the above-described system, laminating quality is deteriorated by the presence of wrinkles which appear in either the upper leaf or bottom leaf during the laminating process. This creasing or wrinkling may or may not occur in every packet which is laminated but in any event is very undesirable even if it appears in a few packets.

SUMMARY OF THE INVENTION

It is an object of the invention to provide a laminating system which provides a high quality lamination and virtually eliminates any possibility of creasing or wrinkling during the laminating operation.

According to the invention, means are employed for providing an increased drag by increasing pressure in the heating and compression zone along central portions of the article being laminated with a steadily decreasing pressure outwardly towards outer edges of the packet so that a spreading effect results which prevents wrinkling or creasing of the upper or lower laminating films during laminating. Since the pressure and drag in the center is greater than at outer edges, a small wave may be visible in front of the heating and compression zone. This drag may also be achieved by providing a larger area of increased pressure or contact at central portions of the article than at outer portions.

The increased drag at central portions causes a stretching effect there which is not present at outer edge areas. Consequently the wave build-up represents excess material in front of the drag zone.

In order to accomplish the desired increase of pressure and drag along central portions of the object to be laminated relative to edge portions, in a preferred form of the invention a tapered profile is provided in one of the heating elements such as the upper heating element such that when the upper and lower heating elements are spaced a given distance, central portions are spaced closer than outer portions. It is also desirable that this tapering effect be achieved with structure which permits some compression depending upon the pressure being employed. In one preferred form of the invention, the tapering effect is created by employing strips of increasing length stacked in pyramid style upon one another.

Also, in a preferred form of the invention, a lead plate may be employed on at least one of the heater assemblies at an entry point to the heating and compression zone which lip is supported by a compressible material and which lip also is bent in accordance with the desired tapering effect and provides a wiping action upon the laminating packet. Over this lip a sheet of material such as Teflon (trademark of DuPont Corporation) coated fiberglass may be employed.

In an alternate embodiment, rather than employing the vertical tapering profile described previously, a horizontal tapering profile along a running direction of the packet may be employed as described hereafter in greater detail.

BRIEF DESCRIPTION OF THE DRAWINGS

FIG. 1 is a side view of a preferred form of a laminating packet to be used with the laminating system of the invention;

FIG. 2 is a top view of a laminating machine of the invention showing insertion of the packet of FIG. 1;

FIG. 3 is a front view of the packet during movement through the laminating machine;

FIG. 4 is a side view of the heating and compression zone and also the drive rollers for the laminating machine of FIG. 2;

FIG. 5 is an expanded view of the structure shown in FIG. 4;

FIG. 6 is an expanded cross-sectional view taken along line VI—VI of FIG. 5;

FIG. 7 is a bottom plan view of a plurality of strips employed in combination to provide a tapering effect in a vertical direction relative to travel of the article to be laminated;

FIG. 8 is an alternate embodiment of the invention illustrating by bottom plan view a shim strip which tapers along a horizontal running direction of the article to be laminated;

FIGS. 9A and 9B are perspective views of a further embodiment of the invention which combines the tapering concepts of FIGS. 7 and 8; and FIGS. 10A and 10B show a further embodiment of the invention which combines the tapering concepts of FIGS. 7 and 8 in a manner somewhat different than FIGS. 9A and 9B.

DESCRIPTION OF THE PREFERRED EMBODIMENTS

As shown in FIG. 1, with the laminating machine of the invention it is preferable to employ a laminating packet 10 having a top polyethylene heat reactivatible adhesive leaf 12 and similar bottom leaf 13 between which an object or article 11 to be laminated is placed. At a leading edge joining the top and bottom leaves a cardboard tab 15 is attached preferably by tape 14. After the lamination process is completed, the cardboard tab is pulled off from the laminated article. Rather than a laminating packet, continuous laminating film sheets may also be employed together with the wrinkle prevention system of the invention.

As shown in FIG. 2, a laminating machine 16 of the type previously described has an entrance aperture 18 into which the packet of FIG. 1 is inserted. A handle 17 is provided on the machine which brings the heating and pressure elements within the machine together and also may activate laminating drive rollers which engage the tab 15 of the packet so as to pull the packet between the heating and pressure plates which apply a substantially constant pressure as the entire packet is pulled through (see construction of machine as shown in U.S.

Pat. No. 4,097,326), and laminate the film onto the product by application of an even pressure.

As shown most clearly in FIGS. 4 and 5, a heating and compression zone is formed by a top heater assembly 19 and bottom heater assembly 20. Rearwardly of the heating and compression zone upper and lower laminating rollers 22 and 23 are provided which drive or pull the packet and also complete the lamination process. The handle 17 of FIG. 2 typically causes either one or both of the drive rollers or heating assemblies to move vertically so as to approach one another. This is more fully described in the above-mentioned patent.

As shown in FIG. 5, with the system of the invention, a wave 21 in the top film leaf or a wave 9 in the lower film leaf may be visible at the entrance to the heating and compression zone. The variation in pressure (pressure profile) which may create the waves causes a spreading action which eliminates wrinkling or creasing during the laminating process. As previously described, during this time the pressure (pressure profile) between the plates remains constant. The waves may result because of an increase in pressure along central portions of the laminating packet, which pressure decreases towards the outer edges of the packet. The wave has a higher peak at the central portions such as shown at 21a in FIG. 3 than at outer edge portions 21b. Similarly a peak is also created at 8 in the lower wave 9. As shown in FIG. 2, the wave front may expand more rapidly at central portions than at edge portions.

During actual operation, the waves causing the spreading effect may not be clearly visible. However, as long as the pressure distribution is present, the inventive effect is present. This pressure distribution, namely a higher pressure along central portions of the packet and lower pressure at the edges, causes the spreading.

Explained in another way, the increased pressure along central portions of the packet causes an increased stretching effect thereat which is not present at areas along the side edges. Consequently, the material length increases along the central portions and a build-up of such material occurs in front of the increased pressure zone in the form of the above-described wave front. Consequently, it is actually the increased drag at the central portions which causes the wave. As described in the alternate embodiments of FIGS. 8 through 10B, this drag may also be accomplished by providing greater areas of drag along the central portions and lesser areas experiencing drag along the edges of a packet.

The heating and pressure zone may now be described in greater detail by reference to FIG. 5. For the upper assembly 19, a mounting base 24 with a plate-like laminating and compression surface is provided. The mounting base has mounting apertures 25a,b for mounting the assembly within the machine. A cylindrical tie-down 26a is provided which engages one end of a Teflon (trademark of DuPont Corporation) coated fiberglass sheet. This cylindrical tie-down 26a is engaged by a screw or screws 27a which threads into a mounting block 28. Similarly a second cylindrical tie-down 26b is provided at the other side of the mounting base which similarly is attached by one or more screws 27b to the mounting base 24. This second cylindrical tie-down receives the other end of the Teflon sheet which pulls the sheet taut so as to create a sandwich effect with elements to be described hereafter.

At the front of the assembly a metal lead plate 31 is provided having a horizontal lip portion 31a. This lead plate 31 provides a wiping action and is freely movable across a front face 32 of the base since it is retained there solely by pressure of the Teflon sheet. This lip portion rides on a sandwich formed of first and second foam layers 34 and 35. A strip heater 33 with electrical lead-in wires 33a,b is provided between the Teflon sheet and foam strip or layer 34. Between the second foam layer 35 and the base 24 a shim or tapering member 36 is provided more clearly shown in FIG. 6. The tapering member 36 is formed of progressively shorter strips 36a–f of Teflon coated fiberglass stacked in pyramid fashion and attached together preferably by a staple 37.

The bottom heater assembly 20 has a metal plate 38 with an entry lip portion 38a. A bottom electrical strip heater 39 is placed on the plate 38. Electrical lead-in wires 39a,b are provided to the strip heater 39. A thermistor 40 may also be provided to measure temperature.

During operation of the laminating system, as the laminating drive rollers 22 and 23 begin pulling the packet through the machine, the increased pressure and drag at central portions of the heating zone causes a spreading effect which in many cases results in a wave at the front of the heating and pressure zone in both the upper and lower leaves. The wave is caused by stretching as explained previously. This wave is peaked at central portions and is lower at outer portions. The tapering effect in a vertical or thickness direction caused by the stacked strips of decreasing length creates the additional pressure at central regions of the packet. Also, the lead plate 31 with lip 31a is freely movable in accordance with compression of the front edges of the foam strips 34 and 35. Also, the lead-in strip or plate 31 is sufficiently flexible so that it will conform to the tapered contour shown in FIG. 6 perpendicular to the direction of travel of the packet through the machine.

FIG. 7 shows a bottom view of the tapering member or shim assembly formed of the progressively shorter strips 36a–f attached by a staple 37.

In an alternate embodiment of the invention tapering member 36 is replaced by a single layer or strip of Teflon sheet as a shim member 45 which tapers along a horizonal or running direction of the article to be laminated (FIG. 8) such that the area of the shim is greater along central portions of the laminating packet then at locations near the edges of the packet. Consequently, drag will be increased since the shimming action is present at larger areas in the central portion and the resulting stretching will consequently be greater so that a wave front will be created in a manner similar to the wave front described in relation to the embodiment shown in FIG. 5.

FIGS. 9A and 9B illustrate a combination of the concept shown in FIG. 7 and the concept illustrated in FIG. 8. Here, pressure is increased at the central portions by providing a thicker shim assembly having a plurality of layers. However, each of these layers 46a through d are themselves tapered along the running or horizontal direction of the article to be laminated. Consequently, the shim member 46 combines the two above-described effects.

FIGS. 10A and 10B show an alternate embodiment somewhat similar to FIGS. 9A and 9B but wherein a shim assembly is provided having upper layers 47a through d which have a gradually lessening tapering effect for the layers closest to the article to be laminated and wherein the final layer 47e is substantially rectangular without a taper.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A laminating machine system, comprising:
a packet comprised of upper and lower heat reactivatible films on an object;
a heating and comrpession zone provided by upper and lower heater assemblies, at least one of which is movable to directly compress and laminate the film on the object during heating;
means for moving the object and film through the heating and compression zone in a feed direction between the heater assemblies;
at least one of said heater assemblies having means for creating a substantially constant pressure profile formed of increased pressure on a central portion of the top and bottom films upon entry into and throughout movement of the entire packet through the heating and compression zone so as to prevent wrinkling or creasing of the film during laminating by creating a wave front which causes the film to spread out evenly during passage through the heating and compression zone; and
said means for creating increased pressure comprising a tapering member positioned on the one heater assembly for contacting the top or bottom film, said tapering member having a decreasing thickness from a central portion outwardly in a direction perpendicular to the feed direction.

2. A machine according to claim 1 wherein said means for creating increased pressure creates a wave in the top and bottom leaves having a greater amplitude or height at a central portion and lesser amplitude near outer side edges of the film.

3. A machine according to claim 1 wherein the means for creating increased pressure comprises a tapering means for creating a central bulge at a heating and compression surface of one of the heating assemblies for creating greater compression along central portions of the leaves being laminated and a steadily decreasing pressure in the direction of edge portions of the films.

4. A laminating machine for use in laminating upper and lower heat reactivatible films on an object, comprising:
a heating and compression zone provided by upper and lower heater assemblies, at least one of which is movable to compress and laminate the film on the object during heating;
means for moving the object and film through the heating and compression zone between the heater assemblies;
at least one of said heater assemblies having means for creating increased pressure on a central portion of the top and bottom films upon entry into the heating and compression zone so as to prevent wrinkling or creasing of the film during laminating by causing the film to spread out evenly during passage through the heating and compression zone; and
one of the heater assemblies having a base member with a horizontal surface against which a tapering member, foam layer, heater strip sandwich is compressed by a flexible belt covering the sandwich and fastened to the base member.

5. A machine according to claim 4 wherein a metal flexible lip strip is positioned at an entrance end of the heater assembly between the belt and a lead end portion of the foam layer, said strip being mounted so as to permit vertical movement as the foam layer compresses by varying amounts and provides a wiping action upon the laminating packet.

6. A machine according to claim 3 wherein the tapering means comprises a plurality of flexible strips of decreasing length stacked in pyramid fashion.

7. A machine according to claim 4 wherein the flexible belt comprises a Teflon fiberglass belt.

8. A machine according to claim 6 wherein the flexible strips comprise Teflon fiberglass.

9. A machine according to claim 1 wherein the means for creating increased pressure creates a wave in both the upper and lower leaves in front of the heating and compression zone which has a central portion of greater amplitude than, and which leads outer portions of the wave.

10. A laminating system, comprising:
a laminating packet formed of upper and lower film leaves between which an object to be laminated is placed, the upper and lower leaves being joined at a leading edge;
a laminating machine for receiving the packet in a feed direction, said laminating machine having upper and lower heating assemblies directly at an entrance of the packet into the system forming a heating and compression zone in direct contact with the film leaves, and upper and lower drive rollers rearwardly of the heating and compression zone for engaging a leading end of the packet and pulling the packet through the machine; and
at least one of the upper and lower heating assemblies having tapering means for creating a substantially constant pressure profile formed of a greater pressure at central portions of the heating and compression zone and relatively lesser pressure transverse to the feed direction at outer edges of the heating and compression zone on the packet throughout its movement through the zone so as to create a wave which causes a spreading effect which substantially eliminates creasing and wrinkling during the laminating operation.

11. The laminating system of claim 10 wherein the means for creating greater pressure comprises a tapering member which causes a bulging effect in one of the heater assemblies so that central portions of at least one of the heater assemblies approaches more closely to the adjacent heater assembly, and means being provided for permitting selective compression of portions of the curved profile formed by the bulging effect.

12. A laminating machine for laminating upper and lower heat activatible films on an object, comprising:
a heating and compression zone provided by upper and lower heater assemblies;
upper and lower drive rollers forming an engaging nip for conveying the object to be laminated through the machine;
at least one of the heater assemblies being formed of a base, tapering means for providing a curvature profile transverse to a direction of travel of the object through the machine, a foam layer, a heating strip on the foam layer, and a flexible layer stretched over the heating strip, foam layer, and tapering member so as to compress and hold the same against the base member.

13. The machine of claim 12 wherein a flexible strip is provided at a leading edge of the heating and compression zone between a leading edge of the foam strip and the flexible layer and whose curvature conforms to the tapering effect caused by the tapering means.

14. A laminating machine for use in laminating upper and lower heat reactivatible films on an object, comprising:
   a heating zone provided by upper and lower heater assemblies directly at an entrance of the films and object into the machine, at least one of which is movable; laminating roller means rearwardly of the heating zone for moving the object and film through the heating zone and into compression for laminating at the laminating roller means; at least one of said heater assemblies having means for creating a constant pressure profile formed of increased pressure and drag on a central portion and lesser pressure and drag on outer portions of the top and bottom films upon entry into and throughout their entire passage through the heating and compression zone so as to prevent wrinkling or creasing of the film during laminating by creating a wave which causes the film to spread out evenly during passage through the heating zone; and said means for creating pressure comprising a tapering member and a compressible member lying against one another in sandwich fashion on one of the heater assemblies.

15. A laminating machine for use in laminating upper and lower heat reactivatable films on an object, comprising:
   a heating zone located directly at an entrance of the machine provided by upper and lower heater assemblies, at least one of which is movable;
   laminating roller means rearwardly of the heating zone in a running direction of the object for moving the object and film through the heating zone between the heater assemblies and for pressure laminating after passage through the heating zone;
   at least one of said heater assemblies having means for creating a constant pressure profile creating increased drag on a central portion and lesser drag at outer portions of the top and bottom films upon entry into and upon their entire passage through the heating zone so as to prevent wrinkling or creasing of the film during laminating by creating a wave which causes the film to spread out evenly during passage through the heating zone; and
   said means for creating pressure comprising a tapered member and a compressible member lying adjacent one another in sandwich fashion and attached to a heating and pressing surface of the one heater assembly.

16. A laminating machine according to claim 15 wherein the means for creating increased drag causes a stretching of central portions of the film such that resulting excess portions of the film along the central portion builds up in a wave.

17. A laminating machine according to claim 15 wherein the means for creating increased drag comprises means for creating increased pressure at a central portion of the top and bottom of the films relative to pressure at areas along outer edges of the films.

18. A laminating machine according to claim 17 wherein the means for creating increased drag comprises a shim assembly mounted on one of the heater assemblies, comprising a plurality of successively shorter strips arranged in pyramid fashion so as to decrease spacing between the heater assemblies along central portions of the top and bottom films.

19. A laminating machine according to claim 15 wherein the means for creating increased drag comprises a shim member mounted on one of the heater assemblies which has a decreasing length in a running direction of the object from central portions of the shim member to outer portions thereof such that increased pressure resulting from use of the shim is present over greater areas along central portions of the laminating films then along outer portions thereof.

20. A laminating machine according to claim 19 wherein the shim member comprises a plurality of layers arranged in pyramid form with decreasing length in a horizontal perpendicular direction from the running direction of the object and also having a tapering or lessening length dimension from central portions to outer portions along the running direction of the object.

* * * * *